United States Patent

Marraccini et al.

[11] Patent Number: 4,458,073
[45] Date of Patent: Jul. 3, 1984

[54] QUINOPHTHALONIC DYES CONTAINING SILANE GROUPS AND PROCESS FOR PREPARING SAME

[75] Inventors: Antonio Marraccini, Novara; Marcello Pieroni, Milan; Antonio Pasquale, Novara; Luigi Balducci, Pavia, all of Italy

[73] Assignee: Montefluos S.p.A., Milan, Italy

[21] Appl. No.: 458,197

[22] Filed: Jan. 17, 1983

[30] Foreign Application Priority Data

Jan. 18, 1982 [IT] Italy .................. 19152 A/82

[51] Int. Cl.³ .................................. C09B 25/00
[52] U.S. Cl. ............................ 546/14; 8/506; 8/536; 8/537; 8/625; 8/626; 8/632; 8/637; 8/918; 8/657; 546/154; 546/173
[58] Field of Search ............... 546/14, 154, 173; 8/625, 626, 632, 506, 536, 537, 637, 657, 918

[56] References Cited

U.S. PATENT DOCUMENTS 4,101,551 7/1928 Groll et al. .................. 546/154

Primary Examiner—Robert T. Bond
Attorney, Agent, or Firm—Morgan, Finnegan, Pine, Foley & Lee

[57] ABSTRACT

There are described a new class of organic dyes containing silane groups, the composite pigments obtainable therefrom by associating them with a substrate ($SiO_2$, $TiO_2$, $Al_2O_3$), and the processes for preparing same.

The silane organic dyes have the formula (I):

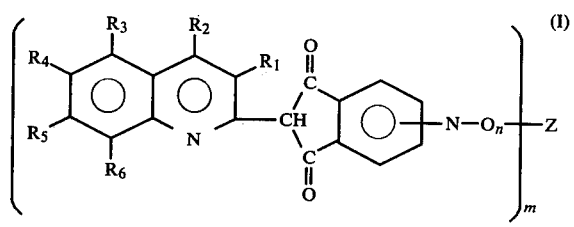

wherein all substituents are defined later.

The silane dyes (I) are utilized per se for dyeing natural fibres, such as wool, and man-made fibres, such as the polyamide, polyester, polyacrylic fibres and the like, while the composite pigments prepared from said dyes by association with an inorganic substrate are employed in paints, air enamels and stoving enamels, in the pigmentation of plastics, in the inks, in the printing of textiles etc.

18 Claims, No Drawings

QUINOPHTHALONIC DYES CONTAINING SILANE GROUPS AND PROCESS FOR PREPARING SAME

BACKGROUND OF THE INVENTION

In literature there have been described processes for modifying with derivatives of the silanic type the surface of materials, such as $SiO_2$, $TiO_2$, aluminas, etc., utilized as fillers and as non-colored pigments. Thus, in the case of the fillers employed in many thermoplastic and thermosetting materials, in order to improve the adhesion between the filler and the other components. The filler or pigment so obtained may be finally coloured with conventional dyes. There are substantially described usual reactive or acid, polysulphonic, and in particular not quinophthalonic dyes, not containing silane residues, soluble in water, these dyes requiring however methods of preparing the relevant fillers or colored pigments different from the methods described in the present invention.

OBJECTS OF THE INVENTION

It is an object of the present invention to provide a new class of quinophthalonic dyes containing silanic groups; another object is that of providing the relevant composite pigments died with said dyes.

Other objects consist in the preparation of the above-said compounds by simple and economic methods.

GENERAL DESCRIPTION OF THE INVENTION

This invention relates to a new type of organic dyes containing, in chemical combination, a silane group, better defined in the following, and to the corresponding composite pigments, obtainable by association with an inorganic solid as well as to the relevant preparation processes.

Whenever used in the following description, "composite pigments" means a pigmentary material, consisting of an association of the abovesaid silicon-containing dyes with an inorganic solid substrate or support, as will be defined more in detail later on.

The above-mentioned association of the organic dye containing silane groups, or briefly silanated dye, with a solid support permits to impart a pigmentary nature to said silanated organic dye.

Such association is obtained by the formation of chemicals bonds (grafting) between the silane portion of the silanated organic dye and the inorganic support.

More in particular the present invention relates to new organic dyes containing silane groups having the following general formula:

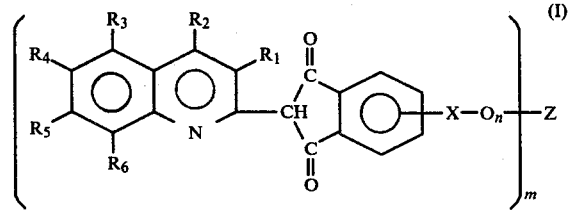

wherein $R_1$ is a hydrogen atom or a hydroxy group; $R_2$, $R_3$, $R_4$, $R_5$ and $R_6$ may be equal or different and represent a hydrogen atom, a halogen, preferably chlorine or bromine, a nitro group, an alkyl or alkoxy group $C_1$–$C_4$; groups ($R_3$–$R_4$) or ($R_5$–$R_6$) together may represent also a benzene nucleus; X is a carbon atom with n=1, or a sulphur atom with n=2, n is equal to 1 or 2; m is an integer selected from 1 and 2; Z represents a silane compound having the formula (II):

wherein W represents an alkyl group having up to 4 carbon atoms or a phenyl group; q is an integer selected from 0 and 1; p is an integer ranging from 3 to 5; V indicates a hydrogen atom or a group —$(CH_2)_2$—$NH_2$, —$C_6H_4$—$NH_2$, —$(CH_2)_2$—$C_6H_4$—$NH_2$; Y represents an alkoxy group preferably selected from the alkoxy groups containing up to 4 carbon atoms, or a hydroxyl group; Z being bound by an aminic bridge derived from one of the aminic groups present in formula (II).

The silane compounds involved are compounds in which the organic chromophoric portion is ascribable to the class of the quinophthalonic dyes.

The above-said silanic dyes are endowed with a certain solubility in organic solvents and possess a good tinting strength with pure shades in the range of yellow, with good stability to sunlight, which render them suited to be advantageously employed in the dyeing of natural fibres, such as wool, and of man-made fibres, such as polyamide, polyester, polyacrylic fibres and the like.

The silanated dyes having formula (I) defined hereinbefore are prepared, according to an aspect of the present invention, by a process characterized in that a silanic derivative of formula (II) defined hereinbefore, is reacted with a quinophthalonic derivative selected from amongst those having formula (III):

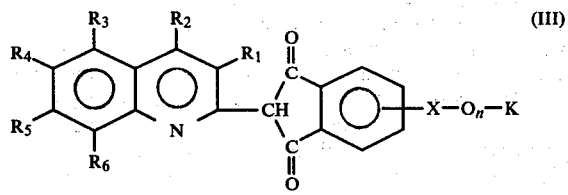

wherein $R_1$, $R_2$, $R_3$, $R_4$, $R_5$, $R_6$, X and n have the meaning already specified and K represents a halogen atom, preferably a chlorine or bromine atom, in a substantially anhydrous and inert organic medium, at a temperature ranging from 20° C. to the reflux temperature of the solvent, preferably from 60° C. to 150° C., in a time period of 1–5 hours, optionally in the presence of an acid-acceptor compound, in a (II):(III) ratio substantially equimolar, up to about 1:2.

As mentioned hereinbefore, it is operated in a substantially anhydrous organic medium, preferably selected from amongst nitrobenzene, dichlorobenzene, xylene, toluene, dimethylformamide, etc.

As acidity acceptors it is possible to employ inorganic compounds ($Na_2CO_3$, $NaHCO_3$), etc., or organic compounds (triethylamine, pyridine), etc., in substantially stoichiometric amounts in respect of the derivative (III).

The quinophthalonic derivatives of formula (III) are compounds preparable according to conventional techniques, for example by halogenation with a thionyl halide of the corresponding acid quinophthalonic dyes of formula (IV), known in themselves,

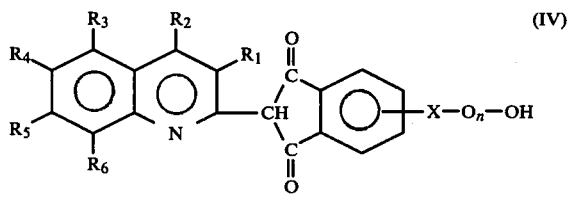

wherein, in respect of formula (III), K is a hydroxyl group, in inert anhydrous organic solvents such as xylene, dichlorobenzene, nitrobenzene, dimethylformamide etc. already previuously described, at temperatures ranging from 70° C. to 120° C. during 2-6 hours.

Examples of quinophthalonic acids (IV) employable according to the present invention are: quinophthalone-5-carboxylic acid; 3'-hydroxy-quinophthalone-5-carboxylic acid; quinophthalone-5-sulphonic acid; 3'-hydroxy-quinophthalone-5-sulphonic acid; 3'-hydroxy-4'-bromo-quinophthalone-5-carboxylic acid; 3'-hydroxy-4'-methyl-quinophthalone-5-carboxylic acid; 3'-hydroxy-6',8'-dibromo-quinophthalone-5-carboxylic acid; 3'-hydroxy-[7',8']-benzoquinophthalone-5-carboxylic acid; 3'-hydroxy-[5',6']-benzoquinophthalone-5-carboxylic acid; 3'-hydroxy-6',8'-dimethyl-quinophthalone-5-carboxylic acid; 3'-hydroxy-quinophthalone-4-carboxylic acid.

These acids, in their turn, constitute known compounds preparable according to conventional techniques, for example by reaction of the derivatives of 2-methylquinoline with trimellitic anhydride in organic solvents, such as trichlorobenzenes, at temperatures of from 150° to 200° C. etc.

Silanic derivatives having formula (II), which have proved particularly suited to the preparation of the silanated dyes of formula (I), according to the present invention, are preferably the ones composed by amino- or polyamino-alkoxy-silanic derivatives, such as for example γ-amino-propyl-triethoxy-silane, δ-aminobutyl-triethoxy-silane, N-β-(aminoethyl)-γ-aminopropyl-trimethoxy-silane, δ-aminobutyl-phenyl-diethoxy-silane, γ-aminopropyl-methyl-diethoxy-silane.

These compounds are known in themselves and commercially available.

However they are preparable, according to substantially conventional techniques, for example by reacting the corresponding chloro-alkoxy-silanes, such as γ-chloropropyl-triethoxy-silane, with aliphatic or aromatic amines or polyamines, such as ethylene diamine, phenylene diamine, etc.

The dyes (I) do not possess, in themselves, any pigmentary characteristic. Nevertheless, according to their structural characteristic, the presence in the molecule of a group deriving from silane (II), as defined hereinbefore, containing alkoxy group, hydrolizable to silanolic groups —Si(OH)₃, imparts to the structure the capability of providing self-condensation reactions between the abovesaid silanolic groups as well as the capability of chemically reacting with the surface of proper inorganic substrates, provided with surface hydroxyl groups (—OH), which condensate with the ones of the silanated dye (I), thus forming a stable chemical bond ("grafting") with the substrate and giving place to a product having pigmentary characteristics.

The abovesaid dyes are therefore preferably employed in the preparation of composite pigments.

The aforecited condensation reactions of the silanated dye (I) with the inorganic substrate, and condensation reactions between molecules of dye (I), permit to chemically "graft" the silanated dyes (I) to the substrate surface, so leading just to a composite structure, according to the present invention, within quantitative ratios controllable in the preparation process.

Thus according to a further aspect of the present invention, from the silanated quinophthalonic dyes having formula (I) described hereinbefore it is possible to obtain colored composite pigments by means of the above-mentioned grafting technique.

The process for preparing the composite pigments composed by the silanated quiniphthalonic dyes (I) and by the abovesaid supports consists in treating the selected substrate with the silanated dye (I) in an organic inert solvent, optionally miscible with water, at a temperature comprised between 20° C. and the solvent refluex temperature, preferably between 60° C. and 150° C., and in the presence of water (acid due to HCl or alkaline due to NaOH) with an at least equimolar ratio in respect to the present alkoxy groups to be hydrolized.

At the conclusion of the reaction, there are sufficient from 2 to 16 hours of abovesaid treatment, optionally after partial distillation of the solvent and water; the resulting pigment is filtered, the wet paste is treated at 100°-140° C. preferably for about 2-16 hours, then it is washed with organic solvents in hot conditions and dried.

As an alternative, the silanated dye containing alkoxy groups (I) is first separately hydrolized, at temperatures ranging from 20° C. to the solvent reflux temperature, for 1-4 hours, with an excess of preferably alkaline water (NaOH, etc. up to about 10%) or of acid water (HCl etc. up to about 10%), then it is filtered, washed with water up to neutral pH of the washing waters and successively, after drying, it is employed for treating the substrate in an organic solvent as described hereinbefore. The process can be also directly carried out by using water as a reaction medium.

To improve the condensation of the dye coating on the substrate it can be advantageously operated in the presence of catalysts such as LiOH, CF₃COOH, Pb acetate, cobalt naphthenate, etc.

Further advantages are achievable when the above-cited treatment is accomplished also in the presence of tetra-alkoxy-silanes having up to 4 carbon atoms, such as Si(OCH₃)₄ or vinyl-triethoxy-silane ₂HC=CH—Si—(OC₂H₅)₃, or alkyl-ortho-titanates, such as Ti-(OC₄H₉)₄, in amounts ranging from 0.1:1 to about 1:10 by weight referred to the dye of formula (I), with which they form insoluble copolymers, which are particularly suitable for coating the substrate, as mentioned hereinbefore.

The inert organic solvents employed are preferably selected from the aliphatic hydrocarbons (n-heptane) and chlorinated derivatives thereof (tetrachloroethane), alicyclic and aromatic hydrocarbons (benzene, toluene, xylenes, nitrobenzene, chlorobenzenes), the ethers and the alkyl or aryl ketones (N-methyl-pyrrolidone, diphenylether), the oxides (dioxane), the amides (dimethylformamide), the nitriles (acetonitrile), the sulphoxides (dimethylsulphoxide) etc.

As substrates and supports are advantageously used: $TiO_2$, in its gel, semicrystalline, rutile or anatase forms, also of the commercial type, characterized in themselves by the presence of surface coatings, consisting of mixtures containing one or more oxides selected from amongst $SiO_2$, $Al_2O_3$, $TiO_2$, or it is possible to employ physical mixtures of TiO$_2$ with SiO$_2$ and/or Al$_2$O$_3$ or, finally, SiO$_2$ or Al$_2$O$_3$, finely particulated. Aluminosilicates (clays), mica, talc etc. are employable as well.

The specific surface of such materials may vary over a wide range, from 5 to 500 m$^2$/g, advantageous results being obtained with specific surface ranging from 10 to 200 m$^2$/g.

In relation to the uses, hiding power to be attained, etc., the abovesaid substrates or supports may be also utilized in admixture with each other.

The preparation process forming the object of this invention results particularly useful to obtain brightly dyed pigments endowed with a high tinting strength, also in the presence of inorganic substrates having a low specific surface, such as e.g. highly hiding TiO$_2$.

The pigments obtained according to the present invention have a composition varying over a wide range, depending on nature, amount of silanic dye, of inorganic substrate, granulometry, specific surface, etc.

Particularly preferred due to the excellent characteristics are the composite pigments obtained according to this invention, containing the silanic-organic portion of formula (I) grafted in amounts approximately ranging from 10 to 50% by weight referred to the total amount.

The composite pigments so obtained exhibit excellent pigmentary characteristics, are insoluble in water and in the common organic solvents, and possess furthermore a good tinting strength, excellent stabilities to heat, to sunlight, to bases and acids, to migration in plastic materials, such as polyvinylchloride (PVC), to overpainting in stoving enamel, and are easily dispersible, etc. Finally, they are obtainable both in the transparent form and in a very hiding form.

They are therefore best utilized in the painting products, in the air and stoving enamels, in the pigmentation of the plastic materials, in the inks, in the printing of textiles etc. according to conventional applicative techniques.

The pigments obtained according to the present invention exhibit the advantage of consisting of a portion, or inorganic substrate, of low cost and capable of imparting excellent pigmentary characteristics, among which, in particular, the desired hiding power degree, on which portion an organic dye andowed with a high tinting strength and pure shades is grafted.

Such advantage can be better appreciated if one considers that the organic silanated dyes (I), as already mentioned herein, may be more or less soluble in the organic solvents and therefore may not possess by themselves any pigmentary characteristic, which is conversely attained by the composite pigments of the present invention.

This permits, in more than one application, to improve the organic dyes, successfully and economically extending the use thereof to pigmentary applications which are very interesting from an industrial viewpoint.

In this respect the present invention represents a considerable contribution to the solution of the problem represented by the high toxicity connected with the utilization of the inorganic pigments, which are broadly employed and now objectable from this viewpoint, such as for example the pigments based on chrome and lead.

Conforming to such constitution, the granulometric analysis of the composite pigment obtained according to the present invention proves that the organic portion is essentially distributed on the surface of the inorganic substrate particles.

The mechanical and/or heat treatments employed in the conventional techniques for the use of the pigments in the various applicative fields, do not substantially modify the granulometry and, by consequence, the pigmentary characteristics of the products obtained according to this invention.

The invention will be now described more in detail in the following examples, which are given, however, for illustrative purposes.

Unless otherwise specified, all parts and percentages etc. are to be understood as parts and percentages by weight.

EXAMPLE 1

(a) Preparation of the silanated derivative of 3'-hydro-quinophthalone-5-carboxylic acid A suspension of 37.5 parts of 3'-hydroxy-quinophthalone-5-carboxylic acid in 130 ml of nitrobenzene at 40° C., additioned with 24.9 parts of thionyl chloride dissolved in 20 ml of nitrobenzene, was brought to 90°-95° C. for about 7 hours. Successively the temperature was brought to 40° C., 150 ml of benzene at 10° C. were added, it was filtered and the cake was repeatedly washed with n-heptane and then dried.

32.73 parts of chloride so obtained were reduced to pulp in 250 ml of xylene and 9.41 parts of triethylamine, 20.6 parts of γ-amino-propyl-triethoxysilane were added and the suspension was maintained at room temperature for 2 hours. The temperature was successively raised in 1-2 hours gradually up to the solvent reflux temperature and maintained at such level for about 2 hours.

Then it was brought to room temperature, the suspension was filtered, the cake was repeatedly washed with n-heptane and pump-dried.

A yellow dye was obtained which, subjected to elemental analysis, gave the following results:

%C=61.2; %H=5.5; %N=5.4; %Si=5.6.

The determination of the % by weight ethanol content, obtained by hydrolysis in Carius tube and successive determination by gaschromatographic analysis, gave the following result: % of ethanol=17.

The obtained dye, subjected to infrared spectrophotometric analysis, revealed, among other bands, absorption bands characteristic of the amide bridge —CO—NH— at 1650 cm$^{-1}$, 3060 cm$^{-1}$ and 3260–3280 cm$^{-1}$; of the group —Si—(OC$_2$H$_5$) at 960 cm$^{-1}$, 1170 cm$^{-1}$, 1080 cm$^{-1}$, and 1110 cm$^{-1}$ and of the silanolic associated group ≡Si—OH at 3260–3280 cm$^{-1}$.

The abovesaid analyses and IR analysis corresponded to the dye of formula (A)

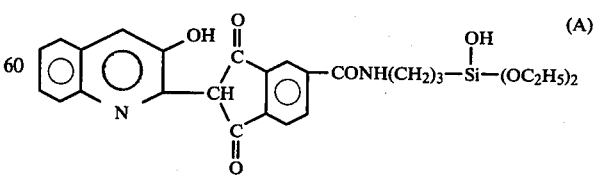

For the synthesis of the composite pigments, according to the present invention, the rought reaction product was advantageously employed.

(b) Preparation of a mixed inorganic substrate of $TiO_2$, $SiO_2$ and $Al_2O_3$.

100 parts of $TiO_2$ were dispersed under stirring in 1000 ml of $H_2O$; the dispersion was heated to 60° C. After a 15-minute stirring, 210 ml of a sodium silicate solution (titre: 365.47 parts/1 of $SiO_2$) were added and successively, in about 3 hours, about 200 ml of an Al sulphate solution (titre: 60 parts/1 of $Al_2O_3$).

Addition was stopped when the pH of the slurry had reached a value of 6. Stirring was continued at 60° C. for 1 hours, then the product was filtered, washed with $H_2O$ to remove the soluble salts, and finally dried at a temperature of 70° C. The dry product was crushed and then ground in an automatic mortar. A white powder having the following compositions was obtained: % $TiO_2=43.4$; % $SiO_2=35.1$; % $Al_2O_3=7.15$; % crystallization water$=14.35$, and a specific surface$=112$ m$^2$/g.

(c) Preparation of the composite pigment in organic solvents

A suspension of 0.9 parts of the silanated quinophtalonic dye (A) of example 1a), 2.1 parts of the inorganic substrate prepared according to b), in 50 ml of dimethylformamide and 0.5 ml of an aqueous solution of HCl (1:3), previously ground overnight in a mill, was introduced into a reactor along with 20 ml of nitrobenzene. The suspension so obtained was gradually brought to reflux temperature and maintained at such level for 12 hours. Successively, a part of the solvent was continuously distilled and replenished with equal volumes of xylenes, for several times. After 6 hours the suspension was concentrated to ⅓ of its initial volume, it was cooled down to room temperature, additioned with about 100 ml of n-heptane and filtered.

The wet cake was treated in an oven at 140° C. overnight, then it was abundantly washed with dimethylformamide, xylene, n-heptane in hot conditions.

After drying there was obtained a yellow product which, by burning at 900° C., resulted to consist for 72% of inorganic ashes. The coloured powder proved particularly stable to the treatments, also in hot conditions, with organic or aqueous solvents; in applications such as stoving enamels or in plastic materials, such as polyvinylchloride, provided yellow-colored products with a particularly pure shade, endowed with an excellent hiding power and a high tinting strength as well as with excellent general stabilities and in particular to overpainting and migration, with a good stability to heat and to sunlight both in mass and in dilution with $TiO_2$.

The silanic dye, as per point 1(a), seems not to possess by itself those pigmentary characteristics which, conversely, are provided according to the present invention by grafting on the inorganic substrate, such as the stabilities to solvents, to overpainting or to migration in applications in stoving enamels or in plastics.

(d) Preparation of the composite pigment in water

A suspension of 0.75 parts of the silanated quinophthalonic dye (A) of example 1(a), 1.75 parts of the inorganic substrate prepared according to 1(b), in 25 ml of aqueous solution of HCl (1:3), was ground 12 hours in a mill and successively introduced into a reactor containing 50 ml of water and 40 ml of aqueous solution of HCl (1:3).

The suspension was refluxed for 5 hours, it was filtered at room temperature and washed with water to neutral pH of the washing water, and the cake was treated overnight in oven at 140° C. The product was successively repeatedly hot-washed with a mixture at 50% of dimethylformamide-xylene, with xylene and n-heptane.

After drying, a yellow product was obtained which, by burning at 900° C., resulted to consist for 74% of inorganic ashes. The colored powder exhibited pigmentary characteristics and general stabilities analogous with the ones of the product obtained according to example 1(c).

EXAMPLE 2

(a) Bromination of the silanated derivative of 3'-hydroxy-quinophthalone-5-carboxylic acid obtained according to example 1(a)

A suspension of 1.61 parts of dye (A) of example 1(a), in 20 ml of acetic acid, heated to 100° C., was additioned with 0.56 parts of bromine. The reaction mixture was maintained 1 hour at 100° C., 1 hour at 120° C., then it was cooled down to room temperature and bromine in excess was sucked by the water pump. The resulting suspension was filtered, abundantly washed with water and dried.

There was obtained a yellow dye exhibiting a reddish shade in respect to the starting dye which, on elemental analysis, gave the following results:

% C=50.5; % H=3.5; % N=5. % Br=14.8; % Si=5.5.

The determination of the % by weight ethanol content, obtained by hydrolysis in Carius tube and successive gaschromatofraphy, gave the following result: % ethanol=absent.

The infrared (I.R.) spectrophotometric analysis of the obtained dye showed the presence of the Si—OH band at 2.9-3μ. The bands of the Si—OEt group were absent, while the bands typical off the amide bridge

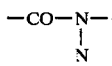

at 3080 cm$^{-1}$ and 1650 cm$^{-1}$ were present.

The abovesaid I.R. analysis as well as the other analyses corresponded to the dye of formula (B)

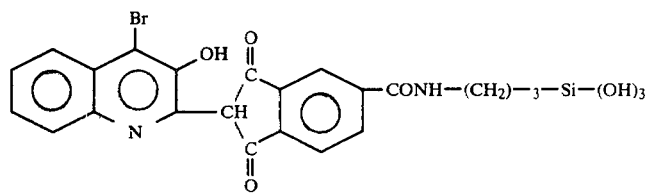

(b) Preparation of the composite pigment

It was operated with the quinophthalonic silanated brominated dye (B), with the substrate of example 1(b), according to the ratios by weight and the modalities of example 1(c): a yellow product was obtained which, by burning at 900° C., revealed to be made for 70.5% of inorganic ashes. The colored powder, besides possessing pigmentary characteristics and general stabilities similar to the ones of the product of example 1(c), possessed, in respect of the latter, a reddisher shade and an even higher stability ot sunlight in applications in stoving enamels and in plastic materials.

EXAMPLE 3

The organic substrate of example 1 or 2 was substituted by $SiO_2$ having a high specific surface $\approx 200$ m$^2$/g and was operated according to weight ratios and modalities analogous with the ones of example 1(c): a bright yellow powder was obtained which, by burning at 900° C., resulted to consist for 72% of inorganic ashes. The composite pigment proved particularly stable to aqueous or organic solvents also in hot conditions; in applications both in stoving enamels and in polyvinylchloride (PVC) it provided transparent products having high general stabilities to migration, overpainting, sunlight and heat, as well as a high tinting strength.

EXAMPLE 4

The inorganic substrate of example 1 or 2 was substituted by $TiO_2$ of the commercial type or by mixtures of commercial $TiO_2$ and $SiO_2$ having a specific surface of about 200 m$^2$/g, and it was operated in the same manner as in example 1: composite pigments with good general stabilities and a very high hiding power—in the case of $TiO_2$ alone—, with a decreasing hiding power,—in the case of the mixtures—were obtained.

EXAMPLE 5

The preparation of the composite pigment of example 1(c) was repeated with the addition of 0.5 ml of vinyl-triethoxy-silane and traces of benzoyl peroxide; by operating in conditions analogous with the ones described in example 1(c), a yellow powder was obtained which, on elemental analysis, revealed to consist for 69% of inorganic ashes. The composite pigment, besides exhibiting pigmentary characteristics and general stabilities similar to those of the product of example 1(c), exhibited an even better tinting strength in the aforesaid applications.

EXAMPLE 6

The preparation of the composite pigment of example 1(c) was repeated with the addition of 0.5 parts of butyl-ortho-titanate, Ti $(O\text{-butyl})_4$; by operating in conditions analogous with the ones described in example 1(c), a yellow powder was obtained which, on elemental analysis, resulted to consist for 70% of inorganic ashes. The composite pigment, beside possessing pigmentary characteristics and general stabilities analogous with the ones of the product of example 1(c), exhibited an even better tinting strength in the abovesaid applications.

EXAMPLES 7–16

By operating according to the techniques described in example 1, yellow composite pigments were prepared by employing various substrates, amino-alkoxy-silanes and quinophthalonic dyes, as indicated in the following Table.

| Examples | Quinophthalonic dyes | Aminoalkoxysilane | Substrate |
| --- | --- | --- | --- |
| 7 | 3'-hydroxy-quinophthalone-5-carboxylic acid | N—β-(aminoethyl)-γ-amino-propyl-trimethoxy-silane | $TiO_2$, $SiO_2$, $Al_2O_3$ (of example 1 c) |
| 8 | 3'-hydroxy-quinophthalone-5-carboxylic acid | N—β-(aminoethyl)-γ-amino-propyl-trimethoxy-silane | micronized $SiO_2$ |
| 9 | 3'-hydroxy-quinophthalone-5-sulphonic acid | γ-aminopropyl-triethoxy-silane | " |
| 10 | 3'-hydroxy-quinophthalone-5-sulphonic acid | " | $TiO_2$, $SiO_2$, $Al_2O_3$ (of example 1 c) |
| 11 | 3'-hydroxy-4'-bromo-quinophthalone-5-carboxylic acid | " | $TiO_2$, $SiO_2$, $Al_2O_3$ (of example 1 c) |
| 12 | 3'-hydroxy-4'-bromo-quinophthalone-5-carboxylic acid | " | micronized $SiO_2$ |
| 13 | 3'-hydroxy-quinophthalone-4-carboxylic acid | " | " |
| 14 | 3'-hydroxy-[7',8']-benzoquinophthalone-5-carboxylic acid | " | " |
| 15 | 3'-hydroxy-[5',6']-benzoquinophthalone-5-carboxylic acid | " | " |
| 16 | 3'-hydroxy-6',8'-dimethylquinophthalone-5-carboxylic acid | γ-aminopropyl-triethoxy-silane | $TiO_2$, $SiO_2$, $Al_2O_3$ (of example 1 c) |

EXAMPLE 17

(Application in PVC)

In a rotary arm mixer there were mixed, at 70° C.:

1.0 parts of the pigment obtained according to example 1(c);

100 parts of powdered polyvinyl chloride (PVC);

1.5 parts of a Ca complex salt of a higher fatty acid (stearic acid) exerting a complexing and stabilizing action;

3.0 parts of epoxidized soybean oil;

0.5 parts of lubricant (mixture of glycerides from $C_{16}$ to $C_{36}$);

2.0 parts of $TiO_2$.

The resulting mixture was then treated at 180° C. in a three-roll refiner until complete dispersion of the pigment in order to obtain a sheet exhibiting a particularly pure yellow shade, with a good color brightness, a good stability to sunlight, a good tinting strength, a good stability to heat and an excellent stability to migration, and endowed with a high hiding power.

EXAMPLE 18

(Application in enamels)

5.0 parts of the pigment obtained according to example 1(c) were mixed by grinding with 95.0 parts of a fluid carried having the following composition:
22% of alkyl resin,
19% of melaminic resin,
59% of xylene.

Homogenization was accomplished in a ball mill by grinding the mixture in the presence of porcelain balls having a diameter of 10 mm, for a time of 24 hours.

The enamel so obtained was applicated onto the surface to be painted, it was allowed to dry overnight, whereafter it was kept in an oven at 120°–125° C. for 30 minutes.

A painting exhibiting a pure yellow shade, an excellent hiding power, a good tinting strength, stabilities to sunlight and to overpainting was obtained.

With a view to obtaining a paint having a lighter shade and a higher hiding power, 1 part of the enamel obtained as described hereinbefore was further diluted with 9 parts of a white synthetic stoving enamel (10% of $TiO_2$) having the following composition:
30% of alkyd resin,
27% of melaminic resin,
33% of xylene,
10% of $TiO_2$.

Homogenization was accomplished in a ball mill by grinding the mixture in the presence of porcelain balls of 10 mm diameter, for a time of 24 hours. The cut enamel so obtained was applicated onto the surface to be painted it was allowed to dry overnight and then it was placed into an oven at 120°–125° C. for 30 minutes. A paint endowed with a pure light yellow shade, good general stabilities and a high hiding power was obtained.

EXAMPLE 19

(Dyeing on polyester fibres)

0.1 parts of the silane dye prepared according the the modalities of example 1(a) were dispersed, hot-dissolved in 30 ml of dimethylformamide; successively, 120 parts of water containing 1 part/l of DISPERGAL ELU (trade-mark of a dispersant produced by Montedison) were added.

The resulting uniform dispersion was employed, after addition with $CH_3COOH/CH_3COONa$ up to a pH value=5, for dyeing 5 parts of a polyester fibre, in AHIBA apparatus, model POLYMAT, starting the cycle at 70° C. and bringing the temperature to 125° C. in 30 minutes. The dyeing was accomplished in a bath at 125° C. for 1 hour, then the temperature was brought to 80°–90° C. and the dyed fabric, once discharged, was repeatedly rinsed and successively scoured with a non-ionogenic surfactant RIOKLEN NF/1° (trade-mark of a surfactant produced by Montedison), for 30 minutes at 70° C.

After final rinsing, a fabric exhibiting a greenish yellow shade with a good dye purity and brightness and good general stabilities was obtained.

EXAMPLE 20

(Dyeing on polyamide fibre=Nylon)

A dispersion of 0.1 parts of dye, obtained according to example 1(a), in 30 parts of dimethylformamide, diluted with 120 parts of water, was additioned with $CH_3COOH$ up to a pH value of 5. The bath was brought to 60° C. and 5 parts of a nylon fabric was immersed thereinto; dyeing was started at 60° C., then the temperature was gradually raised in 30 minutes to 100° C., maintaining such temperature for 1 hour. The final pH of the bath was slightly alakline (pH=7.5–8). It was cooled down to 80° C., the bath was discharged and the fabric was repeatedly rinsed.

Dyeing was carried out in an AHIBA apparatus, model POLYMAT. A fabric exhibiting a greenish yellow shade with a good color brightness and good general stabilities was obtained.

We claim:

1. A compound of the formula (I):

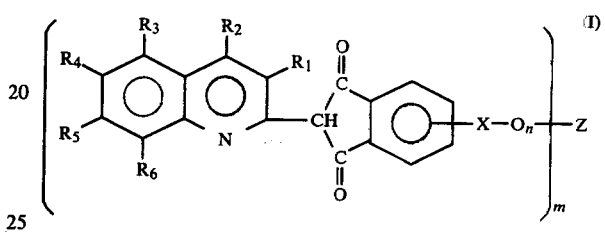

wherein $R_1$ is a hydrogen atom or a hydroxyl group; $R_2$, $R_3$, $R_4$, $R_5$ and $R_6$ may be equal or different and represent a hydrogen atom, a halogen, a nitro group, an alkyl group or an alkoxy group $C_1$–$C_4$; the groups ($R_3$–$R_4$) or ($R_5$–$R_6$), taken together, may represent furthermore a benzene nucleus; X is a carbon atom with n=1, or a sulphur atom with n=2; n and m are integers selected from 1 and 2; Z represents a silane compound having formula (II):

in which W is an alkyl group having up to 4 carbon atoms, or a phenyl group; q is an integer selected from 0 and 1; p is an integer ranging from 3 to 5; V is a hydrogen atom or a group—$(CH_2)_2$—$NH_2$, —$C_6H_4$—$NH_2$, —$(CH_2)_2$—$C_6H_4$—$NH_2$; Y represents an alkoxy group or a hydroxyl group; Z being bond by an aminic bridge derived from one of the aminic groups present in formula (II).

2. A compound of the having formula (I):

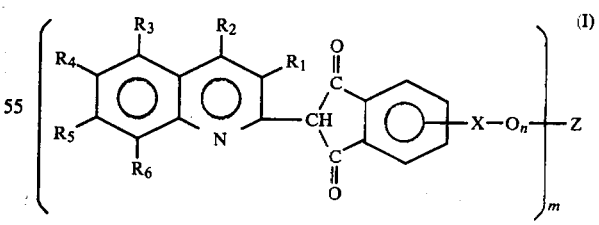

in which $R_1$ is a hydrogen atom or a hydroxyl group; $R_2$ is a hydrogen atom or a bromine atom; $R_3$, $R_4$, $R_5$ and $R_6$ represent a hydrogen atom; X is a carbon atom, n and m are equal to 1; Z represents a silanic compound having formula (II) for q=0, V=H,

in which p is an integer from 3 to 5; Y indicates an alkoxy group selected from the alkoxy groups having up to 4 carbon atoms or a hydroxyl group; Z being bound by the aminic group.

3. A compound according to claims 1 or 2, characterized in that the quinophthalonic portion is selected from amongst: quinophthalone-5-carboxylic acid; 3'-hydroxy-quinophthalone-5-carboxylic acid; quinophthalone-5-sulphonic acid; 3'-hydroxy-quinophthalone-5-sulphonic acid; 3'-hydroxy-4'-bromo-quinophthalone-5-carboxylic acid; 3'-hydroxy-4'-methyl-quinophthalone-5-carboxylic acid; 3'-hydroxy-6',8'-dibromo-quinophthalone-5-carboxylic acid; 3'-hydroxy-[7',8']-benzoquinophthalone-5-carboxylic acid; 3'-hydroxy-[5',6']-benzoquinophthalone-5-carboxylic acid; 3'-hydroxy-6',8'-dimethyl-quinophthalone-5-carboxylic acid; 3'-hydroxy-quinophthalone-4-carboxylic acid.

4. A compound according to claims 1 or 2 characterized in that the amino-alkoxy-silanic compound is selected from amongst γ-aminopropyl-triethoxy-silane, δ-aminobutyl-triethoxy-silane, N-β-(aminoethyl)-γ-amino-propyl-trimethoxy-silane, δ-aminobutyl-phenyl-diethoxy-silane, δ-aminopropyl-methyl-diethoxy-silane.

5. A process for preparing the a compound as defined in claim 1, characterized in that a silane derivative of formula (II) defined hereinbefore is reacted with a quinophthalone derivative selected from amongst those having formula (III):

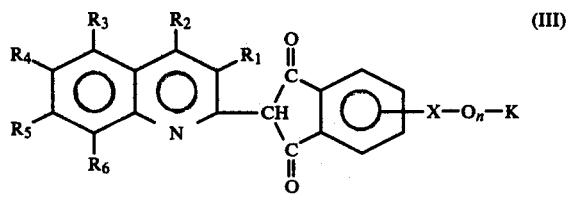

in which $R_1$, $R_2$, $R_3$, $R_4$, $R_5$, $R_6$, X and n have the meanings indicated in claim 1, and Y is a halogen atom, preferably a chlorine or a bromine atom, in an organic, preferably anhydrous and inert medium, at a temperature ranging from 20° C. to the solvent reflux temperature, preferably from 60° C. to 150° C., optionally in the presence of stoichiometric amounts, referred to derivative (III), of acid acceptors, in a substantially equimolar ratio of (II) to (III), up to about a 1:2 ratio.

6. The process according to claim 5, characterized in that the inert organic medium is selected from amongst nitrobenzene, dichlorobenzene, xylene and dimethylformamide.

7. The process according to claims 5 or 6, characterized in that the acidity acceptor is selected from the inorganic compounds, preferably $Na_2CO_3$, $NaHCO_3$, and the organic compounds, preferably triethyl-amine, pyridine.

8. Composite pigments consisting of a compound according to claim 1, grafted on a support or substrate selected from $TiO_2$ gel, semicrystalline, rutile, anatase $TiO_2$ associated with $Al_2O_3$, $SiO_2$, $TiO_2$ and $Al_2O_3$, $SiO_2$, aluminosilicates, mica, talc and/or mixtures thereof, having a specific surface value ranging from 5 to 500 $m^2/g$ and preferably from 10 to 200 $m^2/g$.

9. A process for preparing the pigments defined in claim 8, characterized in that the support is treated with a compound as defined in claim 1, in an inert organic solvent, optionally water-miscible, at a temperature ranging from 20° C. to the solvent reflux temperature, preferably from 60° C. to 150° C., and in the presence of water acid due to HCl or alkaline due to NaOH, in an at least equimolar ratio in respect to the alkoxy groups, and then, after optional partial distillation of the solvent and water, the resulting pigment is filtered and the wet mass is treated at 100°-140° C. during a time period ranging from 2 to about 16 hours.

10. The process according to claim 9, characterized in that the compound containing alkoxy groups as defined in claim 1, is first separately hydrolized with an excess of water preferably alkaline due to NaOH up to about 10%, or acid due to HCl to about 10% by weight, at a temperature ranging from 20° C. to the reflux temperature, and then it is used to treat the substrate in anorganic solvent, according to claim 9.

11. A process for preparing the pigments defined in claim 8, characterized in that the support is treated with a compound as defined in claim 1 in water, at a temperature comprised between 20° C. and the reflux temperature in the presence of HCl or of NaOH up to about 10% by weight and then the resulting pigment is treated as described in claim 9.

12. The process according to claims 9, 10 or 11, characterized in that catalytic amounts of catalysts, preferably selected from amongst LiOH, $CF_3COOH$, Pb acetate, cobalt naphthenate, are additionally employed.

13. The process according to claims 9, 10 or 11, characterized in that it is carried out in the presence of a compound selected from amongst tetra-alkoxy-silanes, vinyl-trialkoxy-silanes, and alkyl-ortho-titanates, having up to 4 carbon atoms, in a weight ratio, referred to the compound according to claims 1 or 2, ranging from 1:10 to about 0.1:1.

14. The process according to claim 13, characterized in that it is carried out in the presence of a compound selected from amongst $Si(OCH_3)_4$, $CH_2=CH-Si(OC_2H_5)_3$, $Ti(OC_4H_9)_4$, in a weight ratio approximately ranging from 1:10 to 0.1:1.

15. The process according to claims 9 10 or 11, characterized in that the inert organic solvent is selected from amongst the aliphatic hydrocarbons, the chlorinated derivatives thereof, the alicyclic and aromatic hydrocarbons, the ethers and the alkyl and aryl ketones, the oxides, the amides, the nitriles, the sulphoxides.

16. The process according to claim 9, characterized in that the inert organic solvent is selected from amongst toluene, benzene, xylenes, N-methylpyrrolidone, dimethylsulphoxide, nitrobenzene, chlorobenzenes, dimethylformamide.

17. The composite pigments according to claim 8, containing from 10% to 50% by weight, approximately, of the silane-organic portion of formula (I).

18. Plastic materials, paints, stoving enamels, inks, pastes for the printing of fabrics and natural or man-made fibres when dyed with the a compound or the composite pigments as per claims 1, 8 or 17.

* * * * *

UNITED STATES PATENT AND TRADEMARK OFFICE
CERTIFICATE OF CORRECTION

PATENT NO. : 4,458,073

DATED : JULY 3, 1984

INVENTOR(S) : ANTONIO MARRACCINI, MARCELLO PIERONI, ANTONIO PASQUALE and LUIGI BALDUCCI It is certified that error appears in the above-identified patent and that said Letters Patent is hereby corrected as shown below:

COLUMN 3, line 13 - Change "previuosly" to --previously--.

COLUMN 4, line 17 - Change "refluex" to --reflux--.

COLUMN 5, line 45 - Change "andowed" to --endowed--.

COLUMN 8, line 43 - Change "gaschromatofraphy" to --gaschromatography--.

line 48 - Change "off" to --of--.

COLUMN 9, line 12 - Change "ot" to --to--.

COLUMN 11, line 6 - Change "carried" to --carrier--.

COLUMN 13, line 23 - In Claim 4, change "$\delta$" to --$\gamma$--.

COLUMN 14, line 41 - In Claim 14, change "13" to --9, 10 or 11--.

Signed and Sealed this

Eighth Day of January 1985

[SEAL]

Attest:

Attesting Officer

GERALD J. MOSSINGHOFF

Commissioner of Patents and Trademarks